No. 757,092. PATENTED APR. 12, 1904.
J. A. CLARY.
CHECKREIN ATTACHMENT.
APPLICATION FILED JULY 29, 1903.
NO MODEL.

Witnesses:-
J. W. Stitt
Geo. W. Lutzman

Inventor
J. A. Clary,
By A. L. Jackson,
Attorney.

No. 757,092. Patented April 12, 1904.

UNITED STATES PATENT OFFICE.

JOHN A. CLARY, OF FORT WORTH, TEXAS, ASSIGNOR OF ONE-THIRD TO HARD BUTLER, OF FORT WORTH, TEXAS.

CHECKREIN ATTACHMENT.

SPECIFICATION forming part of Letters Patent No. 757,092, dated April 12, 1904.

Application filed July 29, 1903. Serial No. 167,372. (No model.)

*To all whom it may concern:*

Be it known that I, JOHN A. CLARY, a citizen of the United States, residing at Fort Worth, Texas, have invented a new and Improved Checkrein Attachment, of which the following is a specification.

My invention relates to improvements for checkreins; and the object is to provide an attachment which will prevent the breaking of the checkreins.

Horses frequently stumble, and the stumbling causes the horses to throw their heads downward. If the checkrein is on the check-hook when a horse thus throws his head downward, the checkrein is generally broken, because something must give way. Various efforts have been made for remedying this defect in harness; but there does not seem to be any effective or satisfactory remedy on the market. I have provided a checkrein-release whereby nothing will be broken, the release simply slipping off the check-hook under abnormal strain. Other objects and advantages will be fully explained in the following description, and the invention will be more particularly pointed out in the claims.

Reference is had to the accompanying drawings, which form a part of this application and specification.

Figure 1:
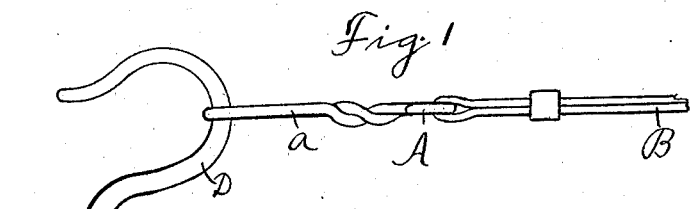
Figure 2:
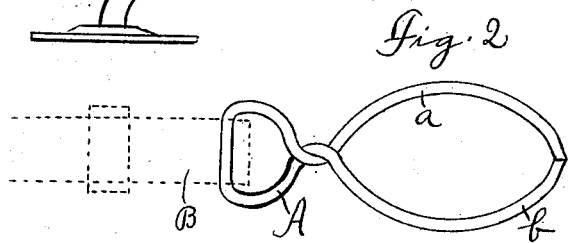
Figure 3:
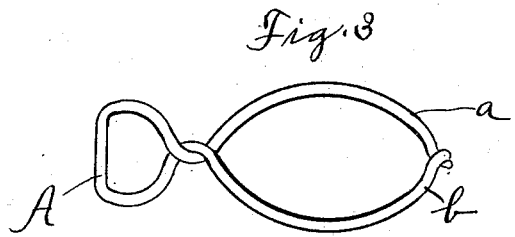
Figure 4:
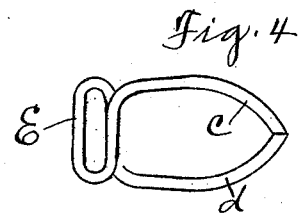

Figure 1 is a side elevation of a checkrein-release applied to a check-hook. Fig. 2 is a plan view of the release. Figs. 3 and 4 show variations in the release, the views being plan views.

Similar characters of reference are used to indicate the same parts throughout the several views.

The improved checkrein-release consists of a single piece of wire bent to form a checkrein-loop A and then twisted, preferably once, and the arms $a$ and $b$ bent in a suitable curve to form spring-arms to engage the check-hook D. The release is permanently attached to the checkrein B. The release, as shown in Figs. 1 and 2, has the spring-arms $a$ and $b$ coming together with abutting ends closing a loop to engage the hook D. The arms $a$ and $b$ have sufficient strength to hold the hook D within the loop against the ordinary pull which a horse makes on the checkrein; but under abnormal strain the arms $a$ and $b$ will spring apart enough to release the hook D without breaking anything, and the release can be hooked on the hook again with very little loss of time.

In Fig. 3 is shown a release having the ends of the arms $a$ and $b$ passing each other slightly. The operation of the release will be the same.

In Fig. 4 is shown a release having a variation in the loop for the hook. The loop E for engaging the checkrein is provided with the spring-arms $c$ and $d$.

The releases shown in the various views operate in a similar manner. The spring-arms of each must be made strong enough to prevent the release of the hook under ordinary service of checking the horse, but must be sufficiently yielding to prevent the breaking of the checkrein.

Having fully described my invention, what I claim as new, and desire to secure by Letters Patent, is—

1. As a new article of manufacture the herein-described checkrein-release comprising a single piece of spring-wire bent at the central part to form a loop for attaching the checkrein and having the ends bent to form an eye for the checkrein-hook and having the terminals thereof pressing together.

2. A checkrein-release comprising a spring-wire having a closed loop formed in the central part thereof for engaging a checkrein and having the terminals thereof bent to form an eye for the check-hook and pressing against each other thereby adapting said eye to be opened under abnormal strain to release the check-hook.

3. A checkrein-release comprising a wire bent to form a loop at the central part thereof for engaging a checkrein and having the arms extending from said loop twisted and bent to form an eye for engaging the check-hook, the terminals thereof being lapped together and capable of being sprung open to release the check-hook under abnormal strain.

In testimony whereof I set my hand, in the presence of two witnesses, this 22d day of July, 1903.

JOHN A. CLARY.

Witnesses:
A. L. JACKSON,
J. W. STITT.